US006920269B1

(12) United States Patent
Sevastian et al.

(10) Patent No.: US 6,920,269 B1
(45) Date of Patent: Jul. 19, 2005

(54) LENS

(75) Inventors: Nick Sevastian, E. Windsor (CA); James E. Nelson, Denver, CO (US)

(73) Assignee: The Gates Corporation, Denver, CO (US)

(*) Notice: Subject to any disclaimer, the term of this patent is extended or adjusted under 35 U.S.C. 154(b) by 64 days.

(21) Appl. No.: 09/616,746

(22) Filed: Jul. 14, 2000

(Under 37 CFR 1.47)

(51) Int. Cl.[7] .................................................. G02B 6/04
(52) U.S. Cl. ....................................................... 385/120
(58) Field of Search ................................. 385/120, 115, 385/901; 340/815.55, 815.47, 815.76, 815.42; 345/31, 32

(56) References Cited

U.S. PATENT DOCUMENTS

| 4,949,227 A | 8/1990 | Finch et al. | 362/61 |
|---|---|---|---|
| 5,010,319 A | 4/1991 | Killinger | 340/472 |
| 5,295,050 A | 3/1994 | Helstern et al. | 362/27 |
| 5,329,386 A | 7/1994 | Birecki et al. | 399/42 |
| 5,384,881 A | 1/1995 | Miller | 385/115 |
| 5,621,829 A * | 4/1997 | Ford | 385/22 |
| 5,639,153 A * | 6/1997 | Bibbiani et al. | 362/32 |
| 5,691,696 A | 11/1997 | Mazies et al. | 340/471 |
| 5,826,966 A | 10/1998 | Schwing | 362/82 |
| 6,007,226 A | 12/1999 | Howard | 362/576 |
| 6,042,256 A | 3/2000 | Gothard | 362/558 |
| 6,175,679 B1 * | 1/2001 | Veligdan et al. | 385/120 |
| 6,195,016 B1 * | 2/2001 | Shankle et al. | 340/815.42 |
| 6,195,477 B1 | 2/2001 | Denuto et al. | 385/15 |
| 6,219,184 B1 * | 4/2001 | Nagatani | 359/472 |
| 6,243,520 B1 * | 6/2001 | Goldman | 385/115 |

* cited by examiner

Primary Examiner—J. F. Duverne
(74) Attorney, Agent, or Firm—J. A. Thurnau, Esq.; C. H. Castleman, Esq.; S. G. Austin, Esq.

(57) ABSTRACT

The invention is a lens. The light transmitting portion of the lens comprises a plurality of fiber optic strands arranged parallel to each other in a side-by-side manner, forming a planar layer. The fiber optic strands are also inclined at an angle to a surface of the lens. This defeats any reflection from the interior of the lens, which gives virtual invisibility to the lens face or surface when the light source is not in use. In operation, when a light source is illuminated, the lens is then lit, displaying the color of the light source or of the color of the strands.

10 Claims, 2 Drawing Sheets

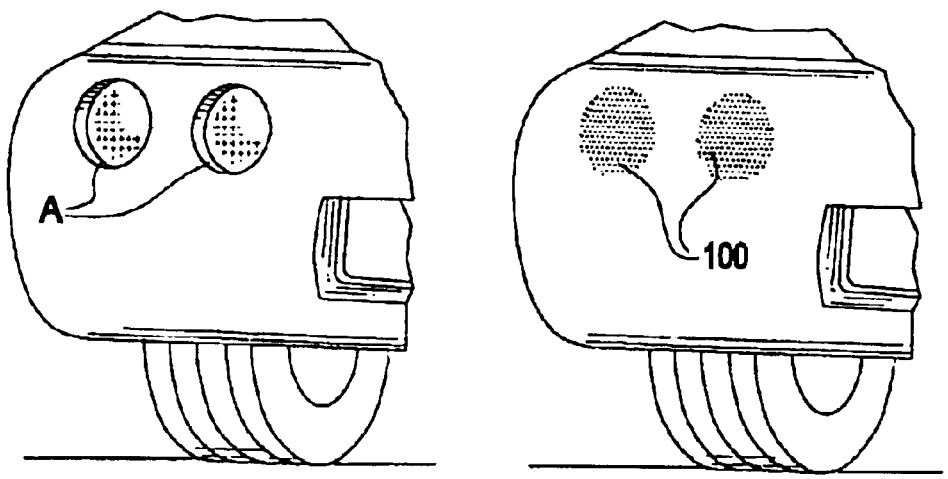
FIG.1
(PRIOR ART)
FIG.2
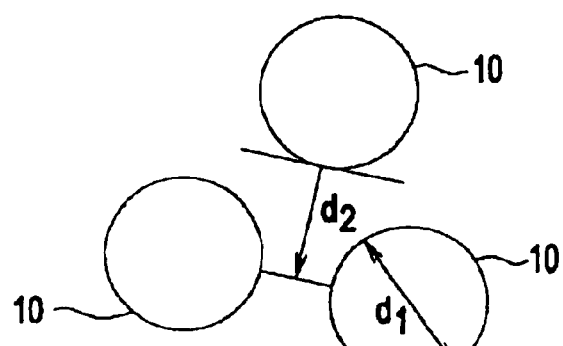
FIG.4

LENS

FIELD OF THE INVENTION

The present invention relates to lenses, and more particularly to signal lenses comprising a bundle of adjacent light transmitting elements.

BACKGROUND OF THE INVENTION

Light transmitting elements, including fiber optic cable is well known for various uses. Its defining trait is its ability to transmit light from a source to an emitter with minimal losses over short or long distances.

It is also known that various vehicles rely on marker lights and headlights, among others, to make them visible during evening hours as well as to provide information to others regarding turns and other vehicular movements.

Marker and headlight lenses have been used in vehicle lighting applications for many years. The lenses generally comprise a transparent plastic or glass material having a tint or color added as necessary to the application. The lens then colors the emitted light as well as providing protection to the bulb. Prior art lenses also comprise a plurality of adjacent convex lens' giving a dot matrix appearance to the marker light in operation.

Prior art uses of the fiber optic cable is primarily focused on transmitting light from a source to an emitter without taking advantage of other unique features of the cable, for example, light transmission efficiency over short distances and the numerical aperture. Further, the plastic lens presents a noticeable feature on a vehicle surface, regardless of its state of operation.

Representative of the art is U.S. Pat. No. 5,826,966 (1998) to Schwing that discloses a lighted bumper guide that uses a singe fiber optic filament extending from a light source to allow a driver to identify the extremity or ends of the bumper of a vehicle.

Also representative of the art is U.S. Pat. No. 5,384,881 (1995) to Miller that discloses a multi-lens luminaire having a generally tubular macro-housing having a plurality of generally tubular micro-housings, each micro-housing retaining a fiber optic light guide emitting light from a remote source of illumination.

The prior art does not teach use of short fiber optic cable strands in an array used as a lens with a light source. The prior art does not teach orienting the fiber optic strands in a single lens to discriminate between different light sources. Nor does the prior art teach use of adjacent, light transmitting elements in an array. The prior art does not teach use of fiber optic strands coordinated with a vehicle surface in such a way as to render a marker lens invisible when not is use.

What is needed is a lens comprising a bundle of light transmitting elements. What is needed is a lens comprising a bundle of light transmitting elements inclined at an angle to a light source. What is needed is a lens comprising a bundle of fiber optic cable strands. What is needed is a lens comprising a bundle of light transmitting elements that discriminate between different light sources. What is needed is a lens comprising fiber optic strands coordinated with a vehicle surface in such a way as to render a marker lens invisible when not is use. The present invention meets these needs.

SUMMARY OF THE INVENTION

The primary aspect of the invention is to provide a lens comprising an array of fiber optic cable strands.

Another aspect of the invention is to provide a lens comprising an array of fiber optic cable strands inclined at an angle to a light source.

Another aspect of the invention is to provide a lens comprising an array of short fiber optic cable strands.

Another aspect of the invention is to provide a lens comprising an array of fiber optic cable strands which discriminate between different light sources.

Another aspect of the invention is to provide a lens comprising fiber optic strands coordinated with a vehicle surface in such a way as to render a marker lens invisible when not is use.

Other aspects of the invention will be pointed out or made obvious by the following description of the invention and the accompanying drawings.

The invention is a lens. The light transmitting portion of the lens comprises a plurality of fiber optic strands forming an array arranged parallel to each other in a side-by-side manner. The fiber optic strands are also inclined at an angle to a surface of the lens. This defeats any direct reflection from the interior of the lens, which gives virtual invisibility to the lens face when not in use. It also allows the lens to transmit the color of a reflective panel disposed behind the lens. In operation, with the light source illuminated, the lens is then lit displaying the color of the light source or of the color of the strands or both. In an alternate embodiment, the strands are arranged so that different groups of strands are each is focused on one or a group of light sources in an array of light sources.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is an elevation view of the prior art.

FIG. 2 is an elevation view of the inventive lens in operation.

FIG. 4 is a plan view of light transmitting elements.

DETAILED DESCRIPTION OF THE PREFERRED EMBODIMENT

Figure 3:
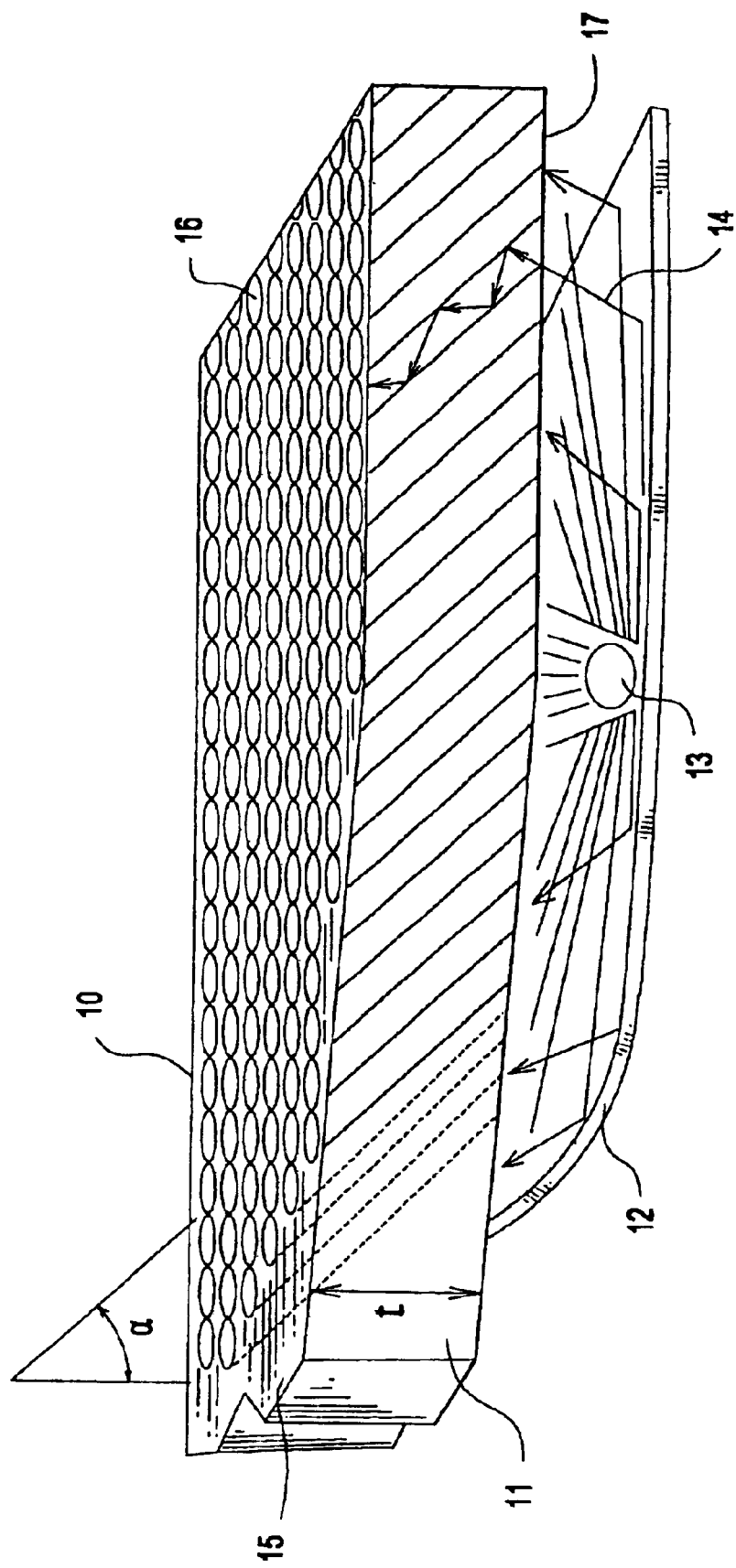
FIG. 3 is a rotated sectional view of the inventive lens.

FIG. 1 is an elevation view of the prior art. The prior art lens A is shown on a vehicle bumper. The lens is immediately apparent on the surface of the bumper.

FIG. 2 is an elevation view of the inventive lens in operation. The lens 100 shown in the same position as the prior art lens. The surface of lens 100 is flush with the outer surface of the bumper. The lens is an integral part of the bumper structure and as such no surface features of the lens are present, such as ridges or depressions.

FIG. 3 is a rotated sectional view of the inventive lens. A plurality of fiber optic strands or light transmitting elements 10 forming an array or bundle are arranged parallel to each other in a side-by-side manner. The strands comprise those known in the art having a core and cladding with different refractive indexes. The strands are embedded or molded into the material comprising the bumper 11 or other vehicle structural component.

The bundled fiber optic strands form a substantially planar surface. However, one skilled in the art can appreciate that the strands may also be arranged so that the form of the lens conforms to any contour required by a designer. The axis of the fiber optic strands in the lens is inclined at an angle α to a normal to surface 15. Angle α in typically in the range of 0° to 45°. The optimum angle is determined by the location of the major axis of each strand as compared to the location of the light source 13. More distant strands may be angled more severely toward the light source. Strands adjacent to the light source being less inclined.

In an alternate embodiment, the strands are arranged so the axis of each strand is aligned with a single light source in an array of light sources. This assures maximum light gathering by each strand as a function of the light acceptance angle of each optical fiber. One skilled in the art can appreciate that different parts of the lens may have strands fhat are oriented toward different light sources, depending on the number and location of the light sources.

The ends 16 of the fiber optic strands are flush with an outer surface 15 of the bumper or other structure. Outer surface 15 is generally transparent, although a tint may be added as required by a user. Outer surface 15 may also have a thickness on the order of 0.5 mm, so no structural feature of the lens appears on the otherwise continuous outer surface of the bumper or other component.

A reflective surface 12 is placed substantially parallel to and located to one side of the planar surface or layer of the fiber optic strands opposite the outer surface 15. A light source 13 is placed between the reflective surface and the planar surface. A light ray 14 emitted by the light source is typically reflected by the reflective surface. It is received through an end 17 of a fiber optic strand. The light ray is transmitted through the fiber optic strand and emitted from end 16. The reflective surface may also comprise a series of reflective ridges that more efficiently reflect and thereby direct the light rays from the light source toward ends 17. The form of each ridge depends on the location of each strand in the array. The shape and arrangement of the ridges is also a function of the numerical aperture of the strands and enhances coupling the light from the light source to the strands.

A plurality or array of light sources may also be included, depending on the needs of the user. For example, a yellow light source and a red light source may be used to depict a turn signal (yellow) and a brake signal (red). The light source may comprise a RfG LED or any other light source known in the art. Each light source may also comprise the termination of a fiber optic cable routed from a remote light source.

In an alternate embodiment, a plurality of fiber optic light sources may each be connected to the end 17 of each strand. Each fiber optic light source would then be individually controllable allowing customization of the appearance of the lens during operation. The lens could display a variety of colors or text, for example "STOP", as required by a user using known light source control methods and apparatus.

The diameter of the fiber optic strands is in the range of 10 μm up to 1 cm. The thickness, t, of the fiber optic bundle layer is set according to the design needs of the user.

FIG. 4 is a plan view of light transmitting elements. Strands 10 each have a diameter dl. The figure depicts a set of three strands, although the relationship can be applied to any number of strands. Connecting tangent points taken on each adjacent strand results in a triangle. Generally, the triangle will be equilateral. A line drawn from a tangent point to the center of an opposing line will have a length $d_2$. In the preferred embodiment, $d_2 < d_1$. The intensity of the transmitted light from the lens is a function of this relationship. Increasing $d_1$ while holding $d_2$ constant will increase the intensity of the emitted light. On the other hand, decreasing $d_1$ while holding $d_2$ constant will decrease emitted light while enhancing the chameleon effect, that is, rendering the location and appearance of the lens undetectable by an observer when the light source is not illuminated.

Although a single form of the invention has been described herein, it will be obvious to those skilled in the art that variations may be made in the construction and relation of parts without departing from the spirit and scope of the invention described herein.

I claim:

1. An automotive signal lens system comprising:

a light source;

a reflective surface;

a plurality of light transmitting elements arranged adjacent and parallel to each other to form a layer;

the layer embedded in a vehicle structural component;

a first line drawn between adjacent light transmitting elements when bisected by a second line normal to the first line drawn from a tangent point on a third light transmitting element, the second line having a length $d_2$;

the light transmitting elements each having a diameter $d_1$; and $d_2 < d_1$; and the light source located between the reflective surface and the layer.

2. The signal lens as in claim 1, wherein the light transmitting elements each have a central axis that is inclined to a reflective surface at an angle in the range of 0° to 45°.

3. The signal lens as in claim 2 further comprising a plurality of light sources.

4. The signal lens as in claim 3 wherein each light source is aligned with at least one light transmitting element.

5. The signal lens as in claim 4, wherein an outer surface of each light transmitting element is coplanar with each adjaeent light transmitting element outer surface.

6. A vehicle signal lens system comprising:

a light source;

a reflective surface;

the light source disposed between the reflective surface and the light emitting surface;

a light emitting surface illuminated by the light source;

the light emitting surface further comprises light transmitting elements each having a central axis and each inclined to the reflective surface at an angle greater than 0° and less than or equal to 45°;

the light emitting surface integral to a vehicle surface;

the vehicle surface transparent to a light transmitted from the light emitting surface; and the light emitting surface is not substantially visually distinguishable from the vehicle surface when the light source is not illuminated.

7. A vehicle signal lens system comprising:

a light source;

a reflective surface;

a plurality of light transmitting elements arranged adjacent and parallel to each other to form a substantially planar layer;

the light source located between the reflective surface and the planar layer; and a first line drawn between adjacent light transmitting elements when bisected by a second line normal to the first line drawn from a tangent point on a third light transmitting element, the second line having a length $d_2$, the light transmitting elements each having a diameter $d_1$, and $d_2<d_1$.

8. A vehicle signal lens system comprising:

a light source;

a reflective surface;

a plurality of fiber optic strands molded into a member material and arranged substantially adjacent to and substantially parallel to each other to form a substantially planar layer; and the light source located between the reflective surface and the planar layer;

a first line drawn between adjacent fiber optic strands when bisected by a second line normal to the first line drawn from a tangent point on a third fiber optic strand, the second line having a length $d_2$, the fiber optic strands each having a diameter $d_1$, and $d_2<d_1$.

9. The signal lens as in claim 8, wherein the fiber optic strands each have a central axis that is inclined to a reflective surface at an angle in the range of 0° to 45°.

10. The signal lens as in claim 8 wherein the member surface further comprises a tint.

* * * * *

UNITED STATES PATENT AND TRADEMARK OFFICE
CERTIFICATE OF CORRECTION

PATENT NO.      : 6,920,269 B1
DATED           : July 19, 2005
INVENTOR(S)     : Nick Sevastian and James E. Nelson It is certified that error appears in the above-identified patent and that said Letters Patent is hereby corrected as shown below:

<u>Title page,</u>
Item [75], should read:
-- [75] Inventor: Nick Sevastian, E. Windsor (CA) --.

Signed and Sealed this

First Day of November, 2005

JON W. DUDAS
*Director of the United States Patent and Trademark Office*